(No Model.)

W. P. WALLING.
COMBINED VEHICLE SEAT AND END GATE.

No. 324,196. Patented Aug. 11, 1885.

WITNESSES
Edwin L. Yewell.
Chas. D. Davis.

INVENTOR
W. P. Walling
By R. M. Alexander
Attorney (No Model.)

2 Sheets—Sheet 2.

W. P. WALLING.
COMBINED VEHICLE SEAT AND END GATE.

No. 324,196. Patented Aug. 11, 1885.

WITNESSES

INVENTOR

UNITED STATES PATENT OFFICE.

WILLIAM PITT WALLING, OF ALBANY, WISCONSIN.

COMBINED VEHICLE-SEAT AND END-GATE.

SPECIFICATION forming part of Letters Patent No. 324,196, dated August 11, 1885.

Application filed April 7, 1885. (No model.)

*To all whom it may concern:*

Be it known that I, WILLIAM PITT WALLING, a citizen of the United States, residing at Albany, in the county of Green and State of Wisconsin, have invented certain new and useful Improvements in Combined Vehicle-Seats and End-Gates, of which the following is a specification, reference being had therein to the accompanying drawings.

My invention relates to improvements in vehicles, and is designed to produce a combined seat and tail-gate in which the seat may be moved to allow free passage from one end of the body to the other, and at the same time the tail-gate form a step by which the ground may be easily reached.

Figure 1:
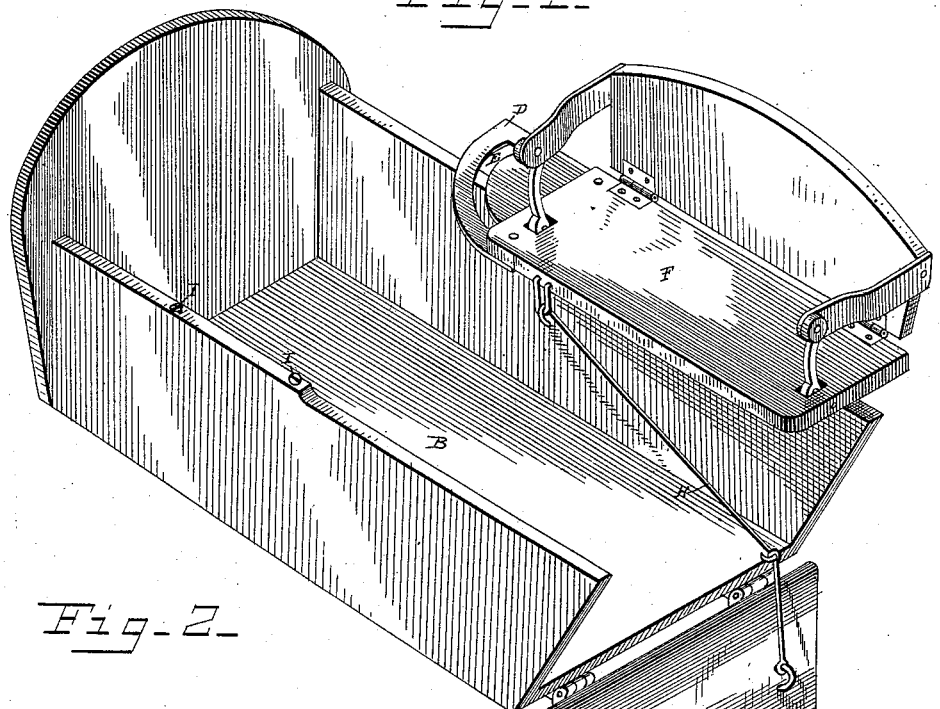
Figure 2:
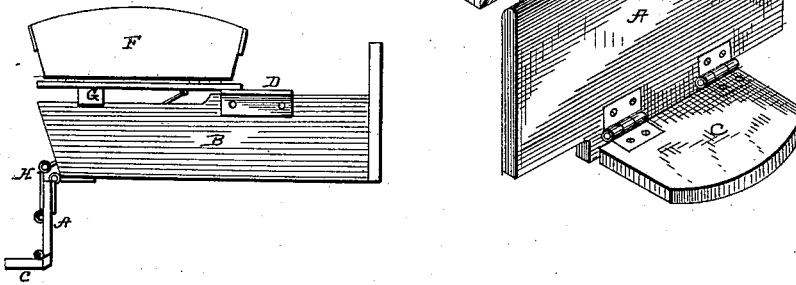
Figure 3:
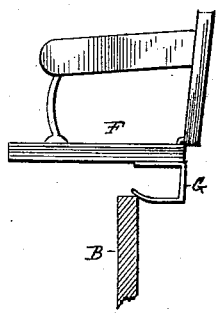
Figure 4:
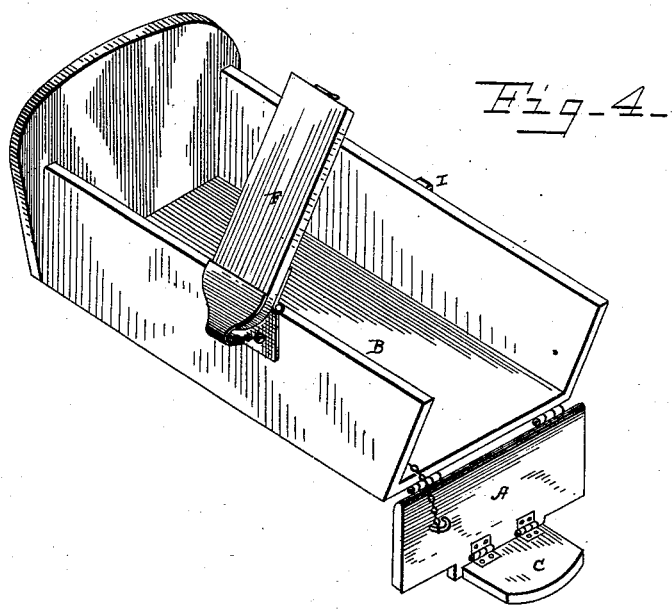
Figure 5:
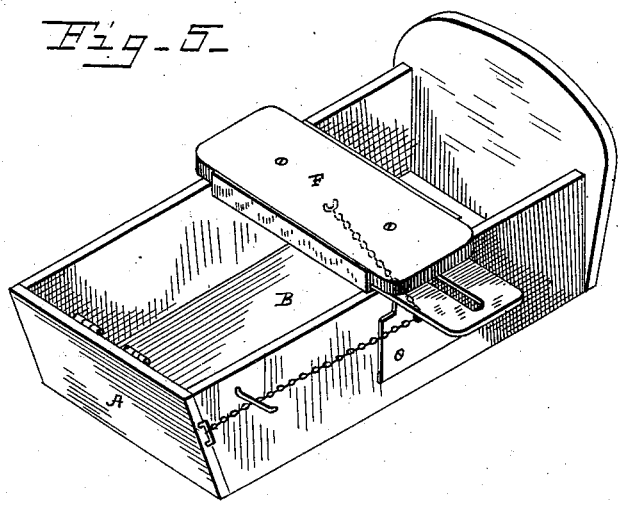

In describing the device reference is had to the annexed drawings, in which Figure 1 represents a perspective view with the seat to one side and the tail-gate down; Fig. 2, a side elevation of the same; Fig. 3, a side elevation of the seat shown in Fig. 1; Fig. 4, a perspective view showing a tilting seat in connection with the tail-gate; Fig. 5, a perspective showing a sliding seat in connection with the tail-gate.

A tail-gate, A, is hinged to the body B, and is provided at its upper or free end with a hinged step, C, so that when down it assumes the position shown in Fig. 1.

To one side of the body is secured a plate, D, provided with a groove, E. To this plate is pivoted or hinged the seat F at one corner, so that a pin passing into the slot will guide the said seat. When turned so as to be parallel with the length of the vehicle-body, a piece, G, on the under side of the seat supports the end not held by the plate D, said piece resting on the side of the body, as shown in Fig. 3.

By means of a jointed rod, H, the tail-gate is connected to the seat near its pivoted end, the connection being at such a point that when the seat is moved into position across the body the tail-gate is lifted from the position shown in Fig. 1 upward till closed. Stops I on the side of the body hold the seat in position when the said tail-gate is closed.

In Fig. 4 is shown a seat hinged or pivoted at one end, and there projecting beyond the side, the projection carrying a chain which passes through a bearing, and from thence to the tail-gate. The raising or lowering of the seat drops or raises the tail-gate.

In Fig. 5 the seat slides laterally, relative to the body, on suitable bearings or ways, and has attached to it a chain or the like, which passes through suitable bearings, and is attached to the tail-gate. By sliding the seat the tail-gate is operated. In each case the said tail-gate falls from gravity; but semi-rigid connections, as in Fig. 1, may be used to facilitate the downward course. A section of the side or a step would operate, in connection with the seat, identically the same as would the tail-board.

In the device shown in Fig. 5 the plate on which the seat rests is slotted to facilitate the guidance of the same.

I claim—

1. A moving seat, in combination with a tail-gate separately connected to a vehicle-body and provided with a step, said seat having connection with the said tail-gate and operating the same, substantially as and for the purpose specified.

2. A seat pivoted or hinged to a vehicle-body, in combination with a tail-gate separately pivoted or hinged to the body and provided with a step, said seat having connection with and operating the tail-gate, substantially as and for the purpose specified.

3. A seat pivoted or hinged at one end to a plate on a vehicle-body and guided by a pin engaging in a slot in said plate, in combination with a movable tail-gate provided with a step, said tail-gate being connected to the seat and operated thereby, substantially as and for the purpose specified.

4. A movable seat guided and supported by a slotted plate secured to a vehicle-body, in combination with a tail-board provided with a step, the seat being connected to the tail-board and operating it, substantially as and for the purpose specified.

5. A seat pivoted at one end to a slotted plate, by which the said seat is guided, and provided with a rest, in combination with a tail-gate hinged to the body and provided with a step at its free end, said seat being connected to and operating the tail-gate, and engaging with stops on the body when in proper relation thereto for use, substantially as and for the purpose specified.

In testimony whereof I affix my signature in presence of two witnesses.

WM. PITT WALLING.

Witnesses:
S. DARROW,
FRED. H. ELLIOTT.